United States Patent [19]

Chizek

[11] 4,214,490

[45] Jul. 29, 1980

[54] METHOD AND MEANS FOR PLACING AN IDENTIFICATION MARK ON A HOG

[76] Inventor: Franklin J. Chizek, 500 Shannon Rd., Papillion, Nebr. 68046

[21] Appl. No.: 914,599

[22] Filed: Jun. 12, 1978

[51] Int. Cl.³ .............................................. B43K 5/00
[52] U.S. Cl. ...................................... 81/9.22; 40/300
[58] Field of Search ........................... 81/9.22; 30/366; 40/300

[56] References Cited

U.S. PATENT DOCUMENTS 516,212  3/1894  Lewis ................................... 81/9.22

FOREIGN PATENT DOCUMENTS 110725  3/1900  Fed. Rep. of Germany ............ 81/9.22

Primary Examiner—James G. Smith

Attorney, Agent, or Firm—Zarley, McKee, Thomte, Voorhees & Sease

[57] ABSTRACT

The method and means for placing an identification mark on a hog is described wherein a tattoo ink is injected simultaneously in and under the skin of the hog to permanently identify the animal or its carcass through skinning or scalding. The method comprises the steps: (1) providing a marking fluid under pressure; (2) providing an identification indicia which is in fluid communication with the marking fluid; (3) injecting the marking fluid in and under the skin of the hog. The apparatus comprises an indicia support means having a plurality of hollow needles mounted therein arranged in a numerical fashion. The needles are in communication with the marking fluid or tattoo ink which is supplied thereto under pressure. The needles may be easily interchanged or replaced as required.

6 Claims, 10 Drawing Figures

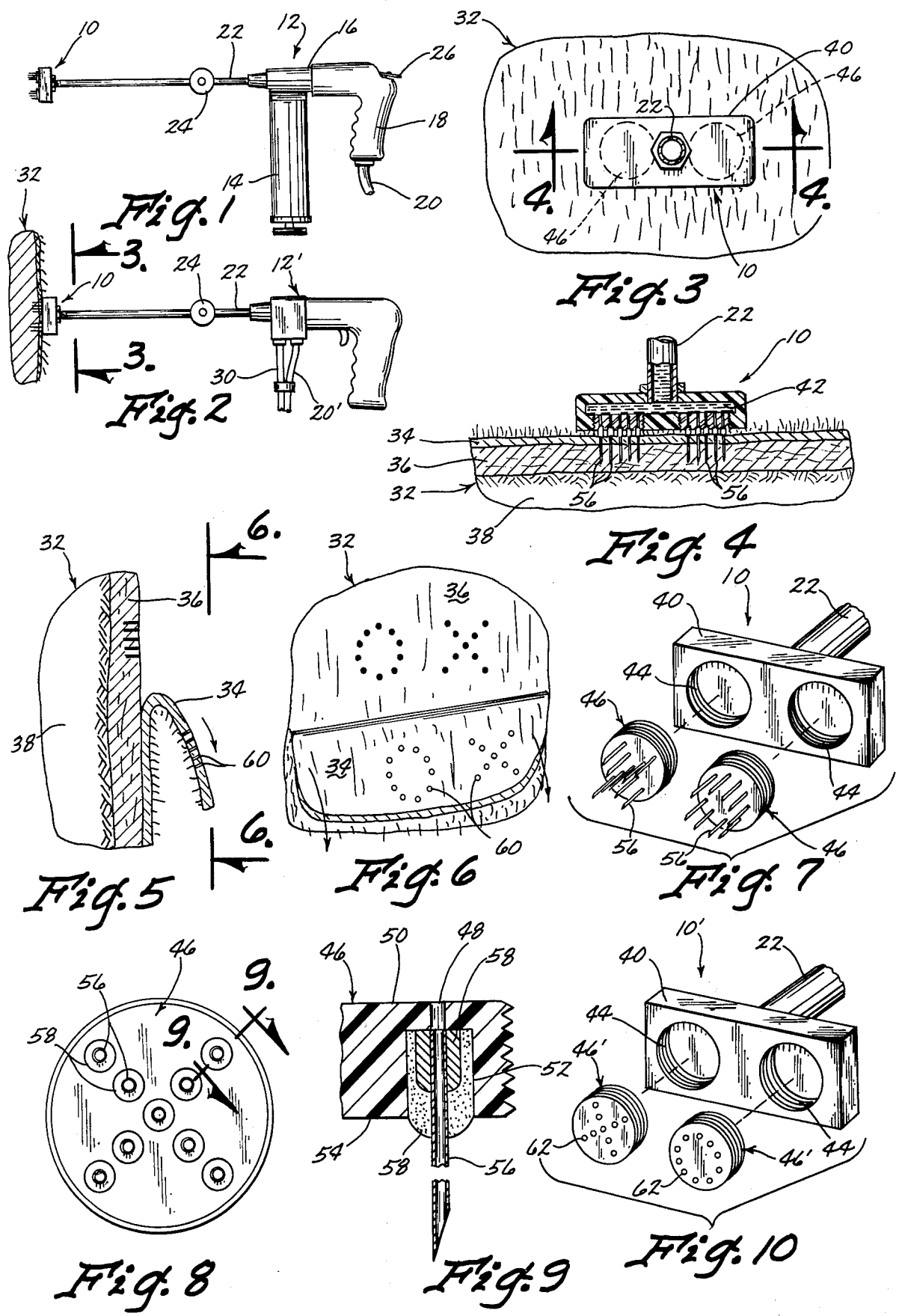

METHOD AND MEANS FOR PLACING AN IDENTIFICATION MARK ON A HOG

BACKGROUND OF THE INVENTION

This invention relates to a method and means for placing an identification mark on a hog.

Federal regulations require that hog carcasses be permanently identified from point of purchase through the slaughter process where they may be scalded or skinned. This identification is required to ascertain the source of diseases and prevent their spread if disease is detected in the slaughter house. The hogs are stunned, bled, scalded or skinned, eviscerated and split. The USDA veterinarian examines the carcass and either accepts or condemns the same. If the carcass is condemned, the veterinarian or inspector records the hog raiser as the source of the particular disease. Grading of the carcass also occurs at this point to determine the purchase price. Thus, it can be seen that it is vitally important that some means be provided for identifying the animal from the point of purchase through the slaughter house.

Previous identification methods consisted of tattooing the skin of the live hog with pins dipped in non-food grade tattoo paste and sharply striking the animal thereby leaving a three digit identifier in the skin capable of persisting ledgibly through the scalding process. The hammer tattooing causes trauma to live animals and causes back fat to be "pulled out" in the area of impact. This results in loss of lard in amounts of one-quarter to three-eighths pound per animal and results in a substantial financial loss in large operations. If the hog is skinned, rather than scalded, the carcass has to be reidentified by tag or retattooing since the skinning removes the tattoo.

At the present time, hogs which are going to be skinned can only be permanently marked by ear tagging which is an expensive method due to the need to restrain the animal for approximately one minute and an expenditure of two to three cents per tag. The ear-tagged animal must still be reidentified during the slaughter operation since the head and ears are normally removed before evisceration, splitting and grading. The operators of the hog buying station are unable to determine whether the purchased animal will end up in a skinning or scalding situation. If the hog is subsequently scalded after being ear tagged, considerable needless expense has occurred since the hog could have been marked with the hammer tattoo method. Added emphasis on permanent identification and skinning has recently been brought about by three converging changes in hog slaughter. One change in hog slaughter operations is due to the recent passage of law requiring a permanent mark from the point of purchase to post-slaughter grading but the United States Department of Agriculture is not presently enforcing the law since no viable method has been developed. A second change in hog slaughter operations is due to the high energy costs associated with scalding operations since it requires considerable energy to maintain a 24,000 gallon scald tank at 165° F. through a 16 hour killing period. Skinning is rapidly supplanting scalding as hog skins become more available. The advent of a satisfactory hog skin tanning system is resulting in the increased value of the hog skins. Heretofore, hog skins were previously cut up with the meat and used in gelatin with some portions of skins being traditionally left with some cuts such as ham and bacon.

Many packing houses wish to pay the owner of the hogs on the basis of grade and yield rather than per head. Since grade and yield cannot be determined on the hoof, it is tattooed at the point of purchase. No problem of identification existed in scalding operations but the changing of plants from scalding to skinning operations will make the reidentifying process a costly expense.

Therefore, it is a principal object of the invention to provide a method and means for placing an identification mark on a hog.

A further object of the invention is to provide a method and means for marking a hog which does not result in a "pull out" of back fat.

A further object of the invention is to provide a method and means for marking a hog which causes the identification mark to remain on the animal even though the skin is removed therefrom.

A further object of the invention is to provide a method and means for placing an identification mark on a hog which does not cause trauma in the area of marking.

A further object of the invention is to provide a method and means for placing an identification mark on a hog which simultaneously injects tattoo paste in and under the skin of the hog to permanently identify the animal or its carcass through skinning or scalding operations.

A further object of the invention is to provide an apparatus for tattooing an animal wherein the identification mark is visible before and after the skin has been removed from the hog.

A still further object of the invention is to provide a method and means for placing an identification mark on a hog which is economical.

These and other objects will be apparent to those skilled in the art.

BRIEF DESCRIPTION OF THE DRAWINGS

FIG. 1 is a side view of one form of the invention;

FIG. 2 is a modified form of the invention being used to place the identification mark on a hog;

FIG. 3 is an enlarged sectional view seen on lines 3—3 of FIG. 2;

FIG. 4 is a sectional view illustrated on lines 4—4 of FIG. 3;

FIG. 5 is a sectional view of a portion of the hog illustrating the identification mark in the fat layer after the skin has been removed;

FIG. 6 is a view as seen on lines 6—6 of FIG. 5;

FIG. 7 is an exploded perspective view of the die head;

FIG. 8 is a plan view of one of the dies;

FIG. 9 is an enlarged sectional view seen on lines 9—9 of FIG. 8; and

FIG. 10 is an exploded perspective view of a modified form of the die head.

DESCRIPTION OF THE PREFERRED EMBODIMENT

In FIG. 1, the numeral 10 refers generally to a die head which is in communication with a means 12 for supplying marking or tattooing ink to the die head 10. In FIG. 1, the means 12 comprises a barrel 14 which is adapted to contain the marking or tattooing ink having a power head assembly 16 connected thereto. The means 12 is provided with a handle 18 having hose 20 extending therefrom which is connected to a source of air under pressure. Pipe 22 extends from the power head assembly to the die head 10 and has a flow indicator 24 imposed therein. Thus, upon actuation of the actuator 26, the tattoo paste will be supplied from the barrel 14 to the die head 10 with the flow indicator 24 indicating if the tattooing paste is actually flowing through the pipe 22. The amount of air pressure present in hose 20 will be primarily dependent upon the viscosity of the tattoo paste being utilized. Primary consideration is that sufficient pressure be used to force the tattooing paste from the needles at the die head as will be described in more detail hereinafter.

FIG. 2 illustrates a modified form of the invention referred to generally by the reference numeral 12'. It can be seen in FIG. 2 that the tattoo paste is not contained within a barrel such as barrel 14 but is supplied to the power head assembly by means of a hose 30. Hose 20' extends from the power head assembly rather than the handle. Many types of devices may be provided for supplying the tattoo paste under pressure to the die head and it should be understood that the embodiments illustrated in FIGS. 1 and 2 are merely for purposes of illustration and are not to be considered as to be controlling.

The numeral 32 refers generally to a portion of the hog including a layer of skin 34, fat layer 36 and meat layer 38.

The die head 10 comprises generally an indicia support means 40 having an interior compartment 42 which is in communication with the interior of the pipe 22 secured thereto and extending therefrom. The support means 40 is provided with a plurality of threaded openings 44 which are in communication with the compartment 42 and which are adapted to threadably receive dies 46. As seen in FIGS. 8 and 9, the die head 46 is provided with a plurality of openings 48 extending from the rearward side 50 to a larger opening 52 at the forward side 54 of the die 46. The numeral 56 refers to a hollow needle including a shank portion 58 which is positioned in the opening 52 so as to be in communication with the bore or opening 48. Needle 56 is maintained in the opening 52 by a low melting point wax such as rose wax 58. The openings 52 are formed in the die 46 in a numerical fashion although FIG. 8 illustrates that the openings are formed in a "X" configuration. Although the drawings illustrate a pair of dies 46 being employed in the die head 40, the usual case would probably be for three of the dies to be positioned in the die head.

In use, the die head 40 is secured to the pipe 22 so that marking fluid or tattoo paste will be supplied to the needles 56 under sufficient pressure so as to inject the same from the tips of the needles. The length of the needles must be such so that the needles will penetrate the skin of the hog and into the fat layer 36 without penetrating the meat layer 38. The layer of skin is normally one-eighth inch thick with the layer of fat 36 being approximately three-quarters to one inch thick. Thus, when it is desired to mark the animal, the means 12 is maneuvered so that the needles 56 penetrate the skin 34 of the animal as illustrated in FIG. 4 without penetrating the meat 38. The means 12 is then actuated to cause a predetermined amount of marking fluid or tattoo paste to be discharged from the needles so that the marking fluid or tattoo paste will be injected into the layer of fat 36 in a predetermined numerical fashion.

As the die head 42 is moved away from the hog, a certain amount of tattoo paste will remain in the openings 60 in the skin 34. Thus, in this case, the letters or identifying indicia "OX" will be visible at the exterior surface of the skin and that identification mark will remain in the skin even if the hog is scalded rather than skinned. If the hog is skinned, the identifying indicia remains in the layer of fat 36 as illustrated in FIG. 6 and will serve to identify the carcass to enable the point of origin to be determined.

The dies 46 will be changed as required to apply the proper identification mark on the hog. If the needles 56 become worn, it is only necessary to place the die head 40 in hot water which will cause the rose wax 58 to melt thereby permitting the needles to be removed from the die head and replaced with new needles.

A modified form of a die head is illustrated in FIG. 10 and is referred to generally by the reference numeral 10'. The only difference between the die heads 10 and 10' is that the needles have been omitted from the die head 10'. The tattoo paste or marking fluid is injected from the orifices 62 in the dies 46' with sufficient pressure so that the marking fluid will be injected through the skin of the hog into the fat layer 36 without the need for the utilization of injecting needles. The apparatus 10' functions identically to the needleless vaccination instruments.

Thus it can be seen that a novel method and means has been provided for marking a hog which eliminates the need for costly ear tags and which also eliminates the need for subsequent tattooing during the slaughter process. The simultaneously injection of marking fluid or tattoo paste into and below the skin of the hog results in an identification mark being placed on the hog which will be permanent whether the hog is subsequently scalded or skinned. The apparatus and method of this invention eliminates the objectionable characteristics of the tattoo hammer and can therefore be seen to accomplish at least all of its stated objectives. While the invention has been ideally described as being suited for use with a hog, it should be understood that it could also be used on cattle or the like if required.

I claim:
1. The method of placing an identification mark on a hog comprising the steps of:
    (1) providing a power head in communication with a source of marking fluid;
    (2) providing an identification indicia support means which is in fluid communication with said power head and which includes a plurality of injection openings;
    (3) placing the identification indicia support means into engagement with at least the exterior surface of the skin of the hog;
    (4) pressurizing marking fluid in said power head; and
    (5) selectively supplying the pressurized marking fluid from said power head to said identification indicia support means under sufficient pressure for injecting said fluid through said injection openings and through the hog's skin to leave an identification mark on the hog at least under the hog's skin so that the said mark will be visible upon subsequent removal of the skin from the hog.
2. The method of claim 1 wherein said marking fluid is supplied to said identification indicia support means in such a manner so that the identification mark is also visible at the exterior surface of the hog's skin.

3. The method of claim 1 wherein said marking fluid is pressure injected into a layer of fat under the hog's skin.

4. The method of claim 3 wherein said marking fluid is needle injected into the layer of fat.

5. The method of claim 3 wherein said marking fluid is injected into the layer of fat from the exterior surface of the hog's skin.

6. An apparatus for placing an identification mark on a hog, comprising, an identification indicia support means having a generally flat surface with a plurality of injection openings formed therein in a predetermined arrangement, a power head assembly, conduit means establishing communication between said identification indicia support means and said power head assembly, a source of marking material in communication with said power head assembly, and means for pressurizing marking material in said power head assembly such that said pressurized marking material is supplied to said identification indicia support means through said conduit means under sufficient pressure that the marking material will be injected through said injection openings and through the hog's skin into a fatty layer below the hog's skin to provide an identification mark on the hog even though the hog's skin is subsequently removed.

* * * * *